Nov. 17, 1925.                                        1,561,507
E. W. CLARK
PINION OR PULLEY COUPLING
Filed April 25, 1925
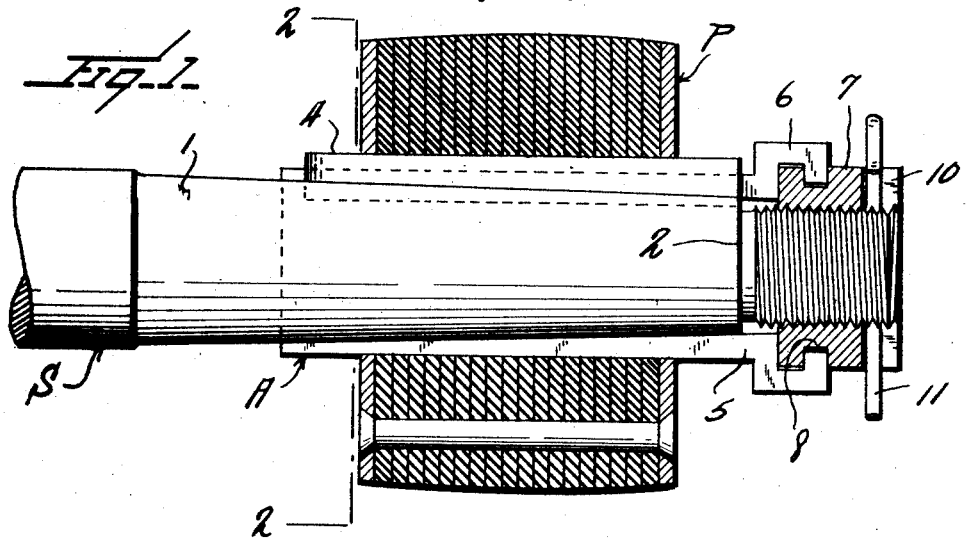
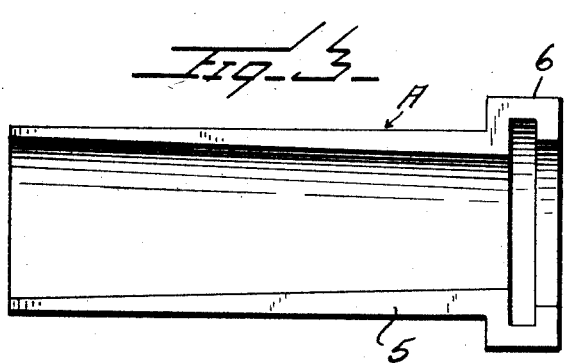
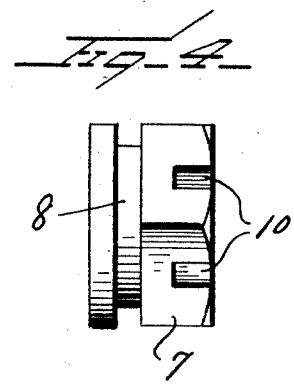
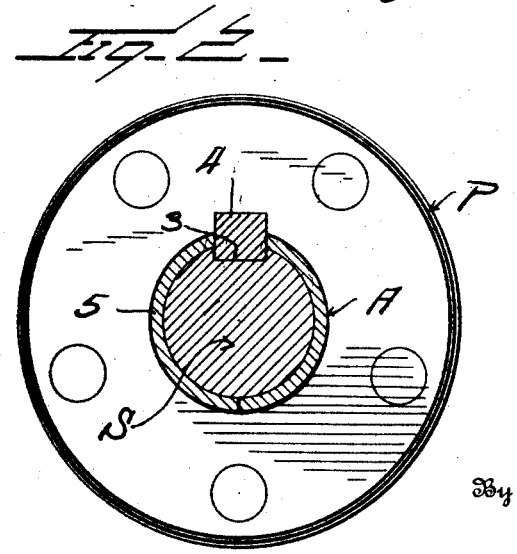
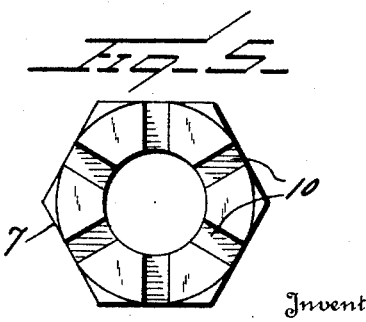
Inventor
E. W. Clark
By Watson E. Coleman
Attorney Patented Nov. 17, 1925.

1,561,507

UNITED STATES PATENT OFFICE.

ED WILLIAM CLARK, OF BYESVILLE, OHIO.

PINION OR PULLEY COUPLING.

Application filed April 25, 1925. Serial No. 25,887.

*To all whom it may concern:*

Be it known that I, ED WILLIAM CLARK, a citizen of the United States, residing at Byesville, in the county of Guernsey and State of Ohio, have invented certain new and useful Improvements in Pinion or Pulley Couplings, of which the following is a specification, reference being had to the accompanying drawings.

This invention relates to certain improvements in shaft couplings and it is an object of the invention to provide means whereby a pulley, pinion or the like may be readily and conveniently fixed to a shaft or removed therefrom without requiring any special tools or the service of a skilled mechanic.

It is also an object of the invention to provide a coupling of this kind wherein a shaft is provided with a tapered portion with which is adapted to cooperate a sectional sleeve adapted to fit on said tapered portion, said sleeve having a similarly tapered bore together with means coacting with the sleeve and shaft for moving said sleeve in either direction upon the shaft, said sleeve snugly fitting within the pulley, pinion or the like.

Another object of the invention is to provide a coupling of this kind wherein a wedging sleeve is provided together with means for imparting requisite movement to said sleeve and wherein a key is employed for coaction with the shaft and member to be fixed thereon, said key operating to hold the sleeve against independent movement about the shaft.

The invention consists in the details of construction and in the combination and arrangement of the several parts of my improved shaft coupling whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view partly in elevation and partly in longitudinal section illustrating a coupling constructed in accordance with an embodiment of my invention;

Figure 2 is a sectional view taken substantially on the line 2—2 of Figure 1;

Figure 3 is a view in elevation of the inner face of a section of the tapered sleeve as herein employed;

Figure 4 is a view in side elevation of the member threaded upon the shaft for imparting requisite movement to the sleeve;

Figure 5 is a view in elevation of the outer end of the member illustrated in Figure 4.

As disclosed in the accompanying drawings, S denotes a shaft having a tapered portion 1 the smaller end of which being continued by a reduced cylindrical extension 2 having its periphery threaded. The tapered portion 1 of the shaft is provided therealong with a key-way 3 for the key 4 for interlocking engagement with the pulley P. While I herein particularly illustrate my improved coupling employed in connection with a pulley it is to be understood that the same can be used with equal facility in connection with a pinion or other member desired to be fixed upon the shaft S.

The sleeve A is longitudinally split to provide two sections 5, the bore of the sleeve A corresponding to the tapered portion 1 of the shaft S, the major diameter of said sleeve being the same from end to end.

Each of the sections 5 of the sleeve A in cross section is less than a semi-circle, such reduction being of an extent to compensate for the width of the applied key 4 so that when the sleeve A is in applied position the same will surround the portion 1 of the shaft S from one side of the key 4 to the other whereby the key 4 provides means effectually preventing the applied sleeve A from having rotary movement about the shaft S.

The end of each sleeve section 5 at the small end of the bore is provided with an internally grooved collar 6 adapted to interlock with an inner end portion of a nut 7 threaded upon the extension 2 of the shaft S, said rear portion of the nut 7 being provided with an annular groove 8 whereby such interlocking may be accomplished in a manner to permit rotation of the nut 7 independently of the sleeve A or each of the sections 5.

The outer end of the nut is castellated to provide the radially disposed slots 10 through which is adapted to be selectively disposed a locking member 11 herein disclosed as a set screw, said member or pin 11 being insertible directly through the shaft extension 2.

In practice, the sections 5 of the sleeve A are first operatively engaged or interlocked with the nut 7 and then the pulley P or its equivalent is mounted upon the sleeve, the major radius of the sleeve being substantially the same as the radius of the bore of the pulley P. The key 4 is then placed in its seat 3 whereupon the sleeve A and the applied pulley P are slid on the shaft S or more particularly the tapered portion 1 until the nut 7 comes in contact with the shaft extension 2, then by turning the nut 7 in the requisite direction the sleeve A together with the applied pulley P are placed in proper position upon the tapered portion 1 of the shaft S. By a few turns by a wrench or kindred implement on the nut 7, the sleeve A is forced against the taper of the portion 1 and caused to expand within the pulley P and thereby assuring an effective mounting on the shaft. After the nut 7 has been properly adjusted the pin 11 is applied to lock said nut 7 against rotation. To remove the pulley P the foregoing operation is reversed.

With a coupling as herein disclosed, the work may be effectively accomplished with an ordinary wrench and without the necessity of any special tool. A coupling of this kind will also prolong the use of costly pinions and pulleys which are ofttimes destroyed when removed from their respective mountings in the various manners now generally employed. My improved coupling as herein disclosed also provides an easy and quick way of placing the pulley or the like on the shaft and retaining the same when once in place and which does not pull the pulley or the like to one side as ofttimes occurs when the key itself is driven home to hold the pulley in position.

From the foregoing description it is thought to be obvious that a shaft coupling constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. In combination with a shaft having a tapered portion, a key-way extending along said tapered portion, a member to be mounted on said shaft having a bore, a sectional sleeve fitting within the bore of said member, the bore of the sleeve being tapered similar to the tapered portion of the shaft, said sleeve when assembled being less than a cylinder to provide a space therealong, a key engaged within the bore of the member and within the space of the sleeve, said key being also engageable within the key-way of the shaft, and a member threaded upon the shaft, said member and the adjacent end portions of the sections of the sleeve being provided with coacting means to connect the sections of the sleeve to said last named member to permit free rotation of said last named member but moving the sleeve endwise with the movement of said last named member lengthwise of the shaft, said last named member being operatively engaged with the end portion of the sleeve having the smaller diameter of bore.

2. In combination with a shaft having a tapered portion, a key-way extending along said tapered portion, a member to be mounted on said shaft having a bore, a sectional sleeve fitting within the bore of said member, the bore of the sleeve being tapered similar to the tapered portion of the shaft, said sleeve when assembled being less than a cylinder to provide a space therealong, a key engaged wihin the bore of the member and within the space of the sleeve, said key being also engageable within the key-way of the shaft, a member threaded upon the shaft, said member and the adjacent end portions of the sections of the sleeve being provided with coacting means to connect the sections of the sleeve to said last named member to permit free rotation of said last named member but moving the sleeve endwise with the movement of said last named member lengthwise of the shaft, and means coacting with the last named member and the shaft for holding said last named member against rotation upon the shaft.

In testimony whereof I hereunto affix my signature.

ED W. CLARK.